Nov. 21, 1961 C. FISCHETT 3,009,612
FISHING HARNESS
Filed Oct. 6, 1958
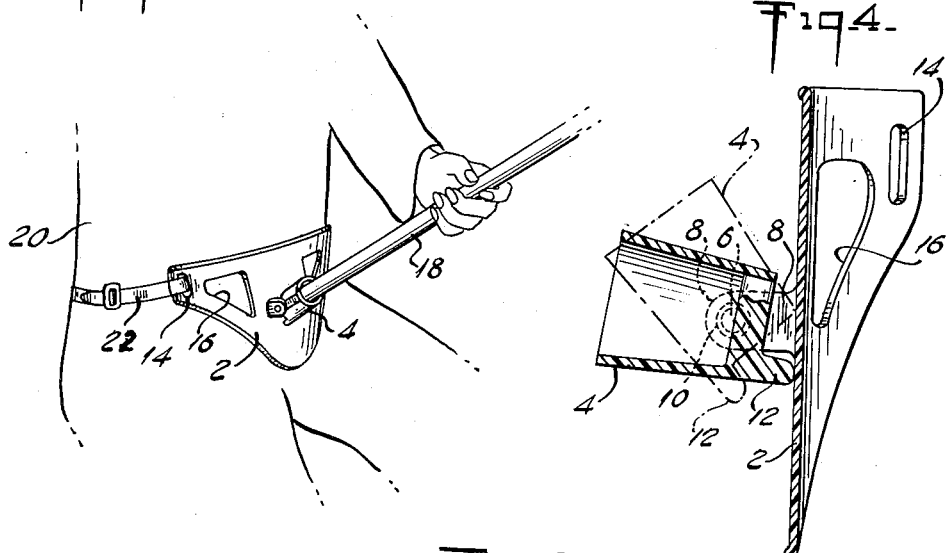
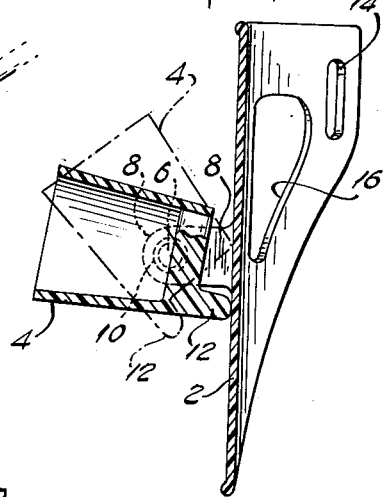
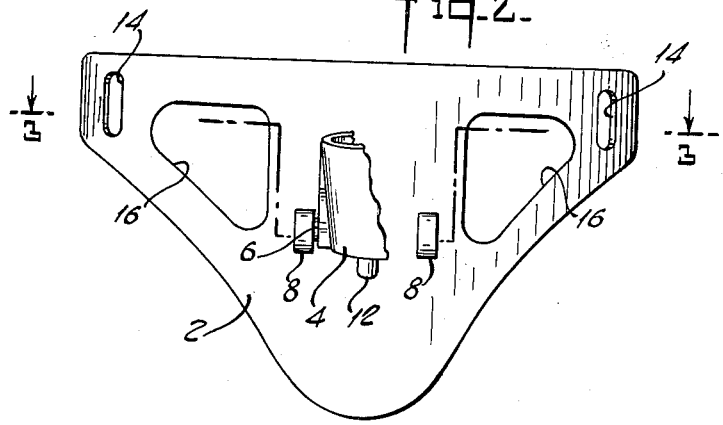
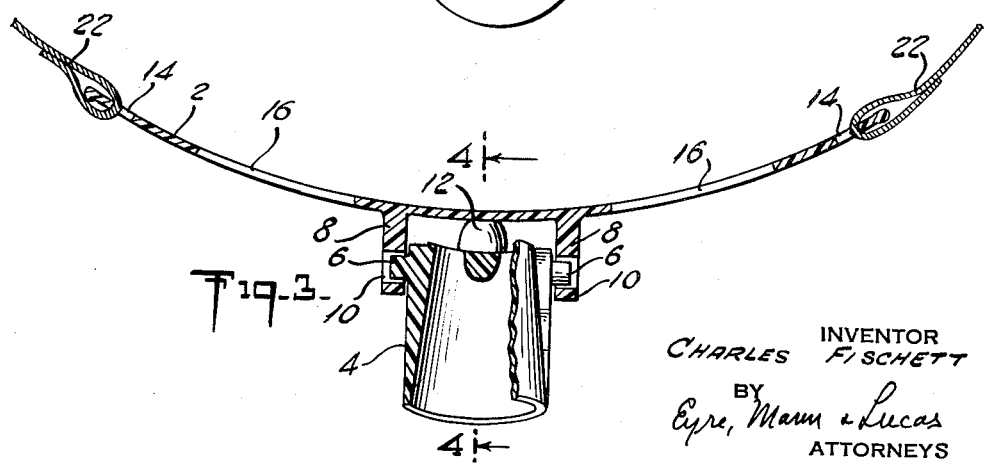
INVENTOR
CHARLES FISCHETT
BY
Eyre, Mann & Lucas
ATTORNEYS

United States Patent Office 3,009,612
Patented Nov. 21, 1961

3,009,612
FISHING HARNESS
Charles Fischett, 129—07 N. Conduit Ave.,
South Ozone Park, N.Y.
Filed Oct. 6, 1958, Ser. No. 765,535
4 Claims. (Cl. 224—5)

The present invention relates to equipment for use by fishermen and comprises a novel harness construction having a socket or cup for bracing a fishing rod to relieve strain during fishing. The new harness may be readily strapped about the waist of the user, is simple and economical to manufacture and has a minimum of parts. The harness is of plastic material that is strong enough to resist distortion in use and yet sufficiently flexible for comfort of the wearer. The construction of the new harness insures against separation of parts when strained in use.

Briefly, the new harness comprises a slightly curved molded shield or plate having formed integral therewith two outstanding brackets with aligned holes therein and a molded cup-shaped socket having trunnions integral therewith which are mounted in the bracket holes. A projection, molded integral with the socket, limits the angle of rotation of the socket in the brackets. The socket is mounted in the bracket while the plate element is at an elevated temperature during or following the molding operation, the plate being temporarily flexed at this stage to spread the brackets far enough apart for entry of the trunnions of the socket into the holes of the brackets. Upon release of the flexing force and complete cooling of the plate member, the socket thus becomes mounted on the plate without the use of screws and without introduction of strain and is not removable from the plate at temperatures encountered in use.

The particular temperatures at which the socket is so mounted on the plate will depend upon the physical characteristics of the plastic material used in fabrication of the parts, but should be substantially higher than any temperature to which the harness will be subjected in use. Accordingly the plastic material selected for use should have such physical characteristics that it can be readily molded, is pliable or flexible at elevated temperatures, is distortion resistant but slightly flexible at temperatures below say 100° F. and has slight or no tendency to cold flow. Many known synthetic resins have such physical characteristics.

Most synthetic resins are made pliable by the combination of a plasticizer therewith. Such resins are most useful for use in the harness of the present invention when they contain no, or a minimum amount of, plasticizer so that they will be only slightly flexible at ordinary temperatures. The thermoplastic resins are easily handled in conventional molding equipment and are particularly adapted for use in the fabrication of the device. Cellulose esters, for example, cellulose acetate, cellulose butyrate, cellulose propionate and the mixed cellulose esters such as cellulose acetate butyrate and cellulose acetate propionate are quite satisfactory, as they are sufficiently pliable at elevated temperatures, and sufficiently inflexible at ordinary temperatures. Other thermoplastic resins can be used, for example, polyethylene, particularly low density polyethylene, polypropylene, copolymers of ethylene and propylene, polystyrene, polyvinyl chloride, copolymers of vinyl chloride, vinylidine chloride such as polyvinylidine chloride (Saran) and polyester resins.

Thermosetting resins also can be used provided polymerization is interrupted for mounting of the socket while the resin is still thermoplastic and flexible. Polymerization can then be completed to an inflexible stage. Typical suitable thermosetting resins are phenolformaldehyde, melamine formaldehyde and urea formaldehyde.

For a better understanding of the invention and of a specific embodiment thereof reference may be had to the accompanying drawing of which FIG. 1 is a perspective view of a harness embodying the invention, the harness being shown in use;

FIG. 2 is a front view of the harness of FIG. 1 with part of the socket broken away;

FIG. 3 is a horizontal sectional view taken on the line 3—3 of FIG. 2; and

FIG. 4 is a transverse sectional view through the harness taken on the line 4—4 of FIG. 3.

In the drawings the plate element of the harness is indicated at 2 and the socket for reception of the lower end of a fishing rod is indicated at 4. The socket 4 is formed by molding and is provided with two trunnions 6 by means of which the socket is mounted on the plate member 2. Formed integral during the molding process with the plate element 2 are upstanding brackets 8 in which are aligned holes 10 for reception of the trunnions 6 of the socket. Formed also on the socket 4 is a projection 12 which in one angular position of the holder 4 abuts the surface of the plate element. As shown best in FIG. 3 the plate element 2 is slightly curved to conform to the body of the wearer and is provided at its ends with suitable means, such as slots 14, for attachment to a belt. Intermediate the ends of the plate and the mid portion upon which are formed the brackets 8, the plate is cut away as indicated at 16 to enhance the resiliency of the plate and reduce the weight thereof. The plate is relatively wide at the mid section and the brackets 8 are substantially centrally disposed thereon so that when the harness is in use the socket is at a level below that at which the plate is attached to the belt of the user. This arrangement insures an extended area over which pressure on the wearer is distributed and also avoids any tendency toward turning of the plate about the belt line.

As heretofore indicated, the socket 4 is mounted in the brackets 8 while the plate element is at an elevated temperature and therefore yielding enough to permit flexing of the plate to spread the brackets 8 far enough apart for entry of the trunnions 6 therein. After final cooling there is sufficient rigidity of the plate element to prevent removal of the holder from the brackets. This is an important feature of the invention because it reduces the number of parts required for construction of the harness, because it insures that the socket will not become dislodged from its mounting during use of the harness, and because strains are not introduced into the plate. It will be noted from the drawings that the plate 2 reaches substantially across the abdomen of the user and is curved to fit around the abdomen. As a result the entire plate bears against the wearer's waist and abdomen and the plate can not be sufficiently flexed over its long end to end reach to buckle over the short distance between the brackets and thereby spread apart the ends of the brackets far enough to allow the trunnions of the socket to separate from the holes in the brackets when under strain. The new harness can be made light in weight and yet sufficiently strong to resist deformation while reeling in large and heavy fish. For example, a harness in which the material employed is cellulose acetate butyrate having a thickness of 3/16" has been found to be sufficiently flexible for comfort and yet strong enough to prevent indentation of the plate by the projection 12 when reeling a two hundred pound fish. It will be understood that during use the projection 12 bears against the surface of the plate 2 and assists are user in bracing and steadying the rod. This position of the holder and projection is shown in FIG. 1 wherein a fragment of a rod is indicated at 18 and a part of the body of a user is indicated at 20, the harness being secured about the body 20 by a belt 22 secured to the plate at the slots 14.

The invention has now been described with reference to a single embodiment thereof. Obviously changes in the particular construction disclosed can be made without departing from the spirit of the invention or the scope of the accompanying claims. For example, the particular shape of the plate element 2 shown in the drawings is not essential nor is it necessary to provide openings such as the openings 16 shown in the specific embodiment illustrated. Although cellulose acetate butyrate is preferred for the material of the harness, other plastic materials, such as previously indicated, could be employed.

The following is claimed:

1. A fishing harness comprising a plate curved to conform to the waist of a user and having a pair of projecting brackets integral therewith and a plastic socket element for reception of the end of a fishing rod and having aligned trunnions extending therefrom and integral therewith, said trunnions being rotatably mounted in aligned holes in said brackets, said plate being made of plastic material flexible at elevated temperatures to permit flexing apart said brackets until said trunnions can be inserted into the aligned holes therein and being sufficiently rigid at normal atmospheric temperatures to prevent such flexing whereby said trunnions are non-removable from said brackets at temperatures encountered in use of the harness.

2. The fishing harness according to claim 1 wherein said plate is of cellulose acetate butyrate and is about 3/16" thick.

3. A fishing harness according to claim 1 wherein said plate is sufficiently long to reach substantially across the abdomen of the user and said brackets are centrally located on the plate and spaced apart a distance relatively short in comparison with the length of the plate.

4. A fishing harness comprising a shield shaped plate curved to conform to the front of the body of a user and provided with means for attachment of a belt thereto, said plate having centrally disposed thereon a pair of projecting brackets formed integral therewith, a socket element for reception of the end of a fishing rod and having horizontally extending trunnions formed integral therewith, said trunnions being rotatably mounted in aligned holes in said brackets, said plate being made of plastic material flexible at elevated temperatures to permit flexing apart said brackets until said trunnions can be inserted into the aligned holes therein and being sufficiently rigid at normal atmospheric temperatures to prevent such flexing whereby said trunnions are non-removable from said bracket at temperatures encountered in use of the harness, said socket element being formed with a projection adapted to engage said plate in one angular position of said socket.

References Cited in the file of this patent

UNITED STATES PATENTS

| | | |
|---|---|---|
| 1,461,071 | Schumacher | July 10, 1923 |
| 1,918,389 | Gerline | July 18, 1933 |
| 1,993,485 | Paul | Mar. 5, 1935 |
| 2,252,504 | Hahn | Aug. 12, 1941 |
| 2,379,928 | Rosenheim | July 10, 1945 |
| 2,557,728 | Drumb | June 19, 1951 |